United States Patent
Ishimaru et al.

(10) Patent No.: US 10,107,280 B2
(45) Date of Patent: Oct. 23, 2018

(54) STRUCTURE FOR SECURING DIAPHRAGM, DIAPHRAGM PUMP AND VALVE DEVICE EQUIPPED WITH THE SAME, AND METHOD OF SECURING DIAPHRAGM

(71) Applicant: SUMITOMO RUBBER INDUSTRIES, LTD., Kobe-shi, Hyogo (JP)

(72) Inventors: Takeshi Ishimaru, Kobe (JP); Kouhei Morita, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 220 days.

(21) Appl. No.: 15/127,258

(22) PCT Filed: Jan. 23, 2015

(86) PCT No.: PCT/JP2015/051851
§ 371 (c)(1),
(2) Date: Sep. 19, 2016

(87) PCT Pub. No.: WO2015/141278
PCT Pub. Date: Sep. 24, 2015

(65) Prior Publication Data
US 2017/0107981 A1 Apr. 20, 2017

(30) Foreign Application Priority Data
Mar. 20, 2014 (JP) .................................. 2014-058750

(51) Int. Cl.
*F01B 19/00* (2006.01)
*F04B 45/04* (2006.01)
(Continued)

(52) U.S. Cl.
CPC ........... *F04B 45/04* (2013.01); *F04B 53/1087* (2013.01); *F04B 53/16* (2013.01); *F15B 15/10* (2013.01)

(58) Field of Classification Search
CPC ........ F15B 15/10; F04B 45/04; F04B 45/041; F04B 45/053
(Continued)

(56) References Cited

U.S. PATENT DOCUMENTS 2,364,111 A * 12/1944 Tucker ................. F04B 45/043
92/98 R
2,445,293 A * 7/1948 Lippincott .......... F04B 43/0054
92/98 R (Continued)

FOREIGN PATENT DOCUMENTS

EP 0613323 A1 8/1994
JP 49-130266 U 11/1974
(Continued)

OTHER PUBLICATIONS

Extended European Search Report, dated Sep. 29, 2017, for European Application No. 15764809.8.

*Primary Examiner* — Michael Leslie
(74) *Attorney, Agent, or Firm* — Birch, Stewart, Kolasch & Birch, LLP

(57) ABSTRACT

By a securing structure, a diaphragm dividing a space into a first chest and a second chest, is secured to a case forming forms the space therein. The case has a first frame having a first concave portion for forming the first chest, and a second frame having a second concave portion for forming the second chest. An edge portion of the diaphragm is compressed and held between the first frame and the second frame which are fitted with each other. The securing structure has a fastener for constricting the first arm portions of (Continued)

the first frame and the second arm portions of the second frame from the outside of the case.

20 Claims, 12 Drawing Sheets

(51) Int. Cl.
*F04B 53/16* (2006.01)
*F04B 53/10* (2006.01)
*F15B 15/10* (2006.01)

(58) Field of Classification Search
USPC ............................................. 92/98 R
See application file for complete search history.

(56) References Cited

U.S. PATENT DOCUMENTS

| | | | |
|---|---|---|---|
| 3,039,272 A * | 6/1962 | Frick | F04B 43/073 92/98 R |
| 4,160,433 A | 7/1979 | Olson | |
| 4,387,788 A | 6/1983 | Slavin et al. | |
| 2010/0055772 A1 | 3/2010 | Nagai et al. | |
| 2017/0122303 A1* | 5/2017 | Morita | F04B 45/04 |

FOREIGN PATENT DOCUMENTS

| | | |
|---|---|---|
| JP | 51-048373 U | 4/1976 |
| JP | 60-155667 U | 10/1985 |
| JP | 11-183359 A | 7/1999 |

* cited by examiner excellent# STRUCTURE FOR SECURING DIAPHRAGM, DIAPHRAGM PUMP AND VALVE DEVICE EQUIPPED WITH THE SAME, AND METHOD OF SECURING DIAPHRAGM

TECHNICAL FIELD

The present invention relates to a structure for securing a diaphragm which divides a space into a first chest and a second chest, to a case which forms the space therein, a diaphragm pump and a valve device which are equipped with the same, and a method of securing a diaphragm.

BACKGROUND ART

In various analyses such as chemical examination, environmental analyses and biotechnological research, a diaphragm pump and a valve device which are equipped with a diaphragm are employed in order to feed an accurate quantity of a fluid being treated.
For example, Patent document 1 discloses a diaphragm pump having a structure such that a diaphragm is secured between a pair of frames, wherein the frames are mutually-coupled by the use of pairs of screws and screw nuts in order to suppress a leakage of the fluid from an edge portion of the diaphragm.

PRIOR ART DOCUMENTS

Patent Document

Patent document 1: Japanese Patent Application Publication No. H11-183359

The leakage of the fluid is caused when the force of the paired frames pressing the diaphragm becomes insufficient locally or overall. Therefore, in the structure for securing the diaphragm, a large number of screws and nuts are used in order to press the diaphragm evenly by a sufficient force.

SUMMARY OF THE INVENTION

Problems to be Resolved by the Invention

In the structure for securing the diaphragm, however, since the number of the parts increases, this becomes a limiting factor of cost-cutting of the diaphragm pump and the valve device. Further, the work of fastening the screws and nuts is time-consuming, and forces the worker to bear the burden, and a man-hour required for assembling the diaphragm pump and the valve device is increased.

In view of the circumstances as described above, the present invention was made, and a primary object is to provide a structure for securing a diaphragm and others capable of achieving a cost-cutting by reducing the number of parts and making the assembling easy.

Means of Solving the Problems

The present invention is a structure for securing a diaphragm which divides a space into a first chest and a second chest, to a case which forms the space therein, characterized in that
the case has a first frame having a first concave portion defining the first chest, and a second frame having a second concave portion defining the second chest,
the first frame has a first frame main body opposed to the second frame, and first arm portions disposed intermittently along an outer edge of the first frame main body and extending toward the second frame,
the second frame has a second frame main body opposed to the first frame, and second arm portions disposed intermittently along an outer edge of the second frame main body and extending toward the first frame, and
an edge portion of the diaphragm is compressed and secured between the first frame and the second frame which are fitted with each other, and
characterized by further comprising
a fastener for constricting the first arm portions and the second arm portions from the outer side of the case.

In the valve device according to the present invention, it is desirable that the first arm portions and the second arm portions are provided with a positional displacement preventing means to maintain the position of the fastener.

In the valve device according to the present invention, it is desirable that the positional displacement preventing means comprises
a first retaining projection disposed on each of the first arm portions and jutting out outwardly of the case on the second frame main body side of the fastener, and
a second retaining projection disposed on each of the second arm portions and jutting out outwardly of the case on the first frame main body side of the fastener.

In the valve device according to the present invention, it is desirable that the positional displacement preventing means is an annular groove extending along an outer edge of the case in the outer circumference surfaces of the first arm portions and the second arm portions.

In the valve device according to the present invention, it is desirable that the first arm portions and the second arm portions are alternately dispersed along the outer edge of the case.

In the valve device according to the present invention, it is desirable that the first arm portions and the second arm portions are continuously provided along the outer circumference of the case.

In the valve device according to the present invention, it is desirable that
the edge portion of the diaphragm is provided with a thick part having a larger thickness.

In the valve device according to the present invention, it is desirable that the first frame and/or the second frame are provided with a positioning groove at which the thick part is disposed.

The present invention is a diaphragm pump equipped with the structure for securing a diaphragm as set forth in any one of claims 1-8 and characterized in that
the first frame is provided with a first port communicating with the first chest,
the second frame is provided with a second port communicating with the second chest,
a fluid for driving the diaphragm is fed to the first chest via the first port, and
a fluid being treated flows in and flows out of the second chest via the second port.

The present invention is a valve device equipped with the structure for securing a diaphragm as set forth in claims 1-8, and characterized in that
the first chest of the first frame is provided with a driving means for driving the diaphragm,
the second frame has an inflow port for allowing the fluid to flow into the second chest, and an outflow port for allowing the fluid to flow out of the second chest,
the outflow port has an opening around which a valve seat is formed, and the diaphragm sits on and leaves the valve seat to close and open the outflow port.

The present invention is a method for securing a diaphragm which divides a space into a first chest and a second chest, to a case which forms the space therein, characterized in that the case has a first frame having a first concave portion defining the first chest, and a second frame having a second concave portion defining the second chest, the first frame has a first frame main body opposed to the second frame, and first arm portions disposed intermittently along an outer edge of the first frame main body and extending toward the second frame, and the second frame has a second frame main body opposed to the first frame, and second arm portions disposed intermittently along an outer edge of the second frame main body and extending toward the first frame, and characterized by comprising a fitting step of fitting the first frame with the second frame, a diaphragm holding step of compressing and folding an edge portion of the diaphragm between the first frame and the second frame, and a fastener attaching step of constricting the first frame and the second frame by attaching a fastener to the first arm portions and the second arm portions from the outside of the case.

Effect of the Invention

The present invention is the diaphragm securing structure for securing the diaphragm which divides the space into the first chest and the second chest, to the case which forms the space therein, wherein the case has the first frame having the first concave portion defining the first chest, and the second frame having the second concave portion defining the second chest, and the edge portion of the diaphragm is compressed and held between the first frame and the second frame which are fitted with each other, whereby the fluid being treated is suppressed from leaking from the edge portion of the diaphragm.

The first frame has the first frame main body opposed to the second frame, and the first arm portions disposed intermittently along the outer edge of the first frame main body and extending toward the second frame, and the second frame has the second frame main body opposed to the first frame, and the second arm portions disposed intermittently along the outer edge of the second frame main body and extending toward the first frame. Further, the structure for securing a diaphragm comprises the fastener for constricting the first arm portions and the second arm portions from the outside of the case, therefore, it is possible to achieve a state in which the first frame and the second frame are firmly fitted with each other. Thus, it becomes possible to reduce the number of parts used in the structure for securing the diaphragm, making the assembling easy, to achieve the cost-cutting.

The diaphragm pump according to the present invention has the structure for securing a diaphragm, wherein the fluid for driving the diaphragm is fed to the first chest of the first frame via the first port, and the fluid being treated flows in and flows out of the second chest via the second port. Thereby, although the diaphragm pump has the simple and inexpensive structure, it is possible to feed an accurate quantity of the fluid being treated.

The valve device according to the present invention has the structure for securing a diaphragm, wherein the first chest of the first frame is provided with the driving means for driving the diaphragm, the second frame has the inflow port for allowing the fluid to flow into the second chest, and the outflow port for allowing the fluid to flow out of the second chest, the outflow port has the opening around which the valve seat is formed, and the diaphragm sits on and leaves the valve seat to close and open the outflow port. Thereby, although the valve device has the simple and inexpensive structure, it is possible to feed an accurate quantity of the fluid being treated.

The method of securing a diaphragm according to the present invention comprises the frame fitting step of fitting the first frame and the second frame with each other. Thereby, the first frame and the second frame are firmly fitted with each other with sufficient strength. The securing method further comprises the diaphragm holding step of compressing and folding the edge portion of the diaphragm between the first frame and the second frame, therefore, the fluid being treated can be suppressed from leaking from the edge portion of the diaphragm. The securing method further comprises the fastener attaching step of constricting the first frame and the second frame by attaching the fastener from the outside of the case to achieve a strong fitting state, therefore, the first frame and the second frame are firmly united and the leakage of the fluid being treated from the edge portion of the diaphragm can be further suppressed.

MODE FOR CARRYING OUT THE INVENTION

Embodiments of the present invention will be described hereunder in conjunction with drawings.

First Embodiment

Figure 1:
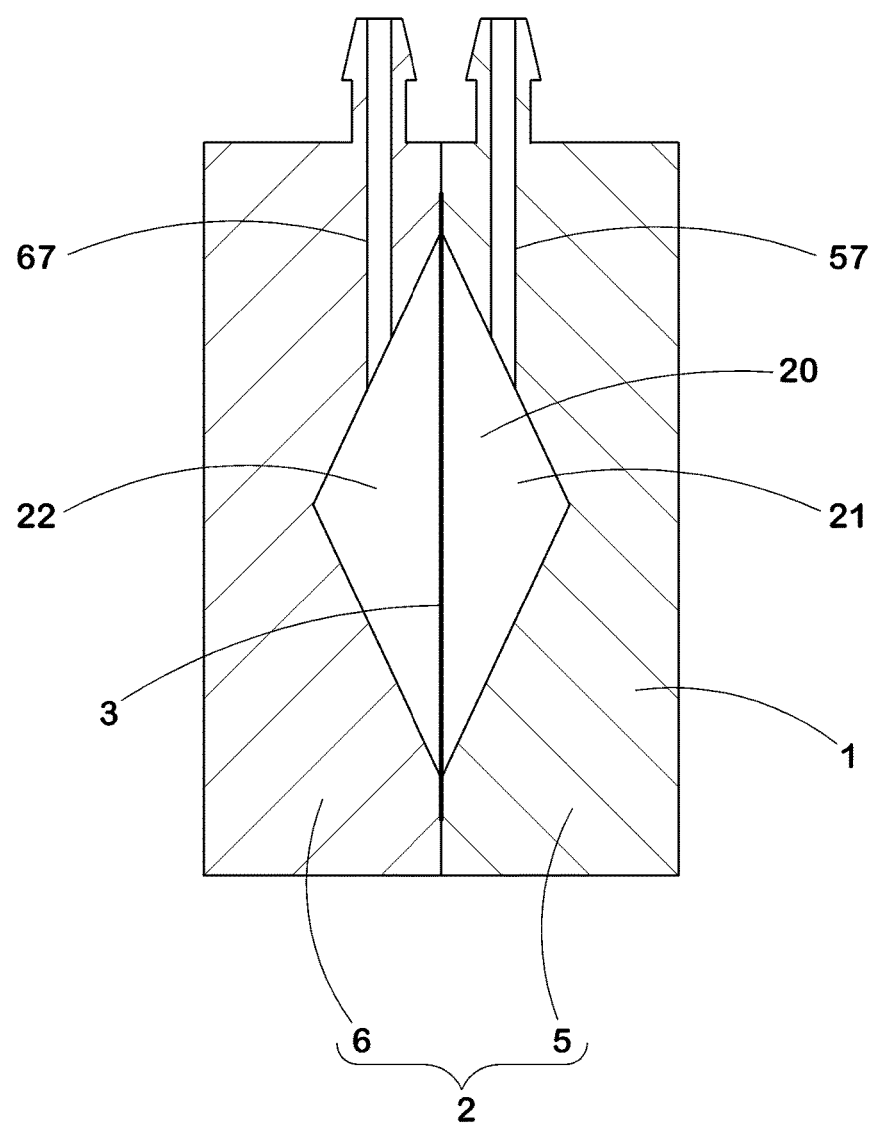
FIG. 1 A diagram showing a part of the structure of an analyzing device equipped with a diaphragm pump as an embodiment of the present invention.

FIG. 1 shows a general structure of a diaphragm pump 1 as a first embodiment of the present invention.

The diaphragm pump 1 is to feed a fluid being treated such as test sample at a constant quantity.

The diaphragm pump 1 has a case 2 forming a space 20 therein, and a diaphragm 3 dividing the space 20 into a first chest 21 and a second chest 22.

By filling up the first chest 21 with a fluid such as gas and discharging the fluid, the fluid being treated is fed from the second chest 22.

Namely, by the gas filling up the first chest 21 and discharged therefrom, the diaphragm 3 is driven and transformed, and the fluid is fed from the second chest 22 at a constant quantity.

The volume of the discharged fluid is determined by the volume of the space 20, the volume of the diaphragm 3 occupying the space 20 and the like.

Figure 2:
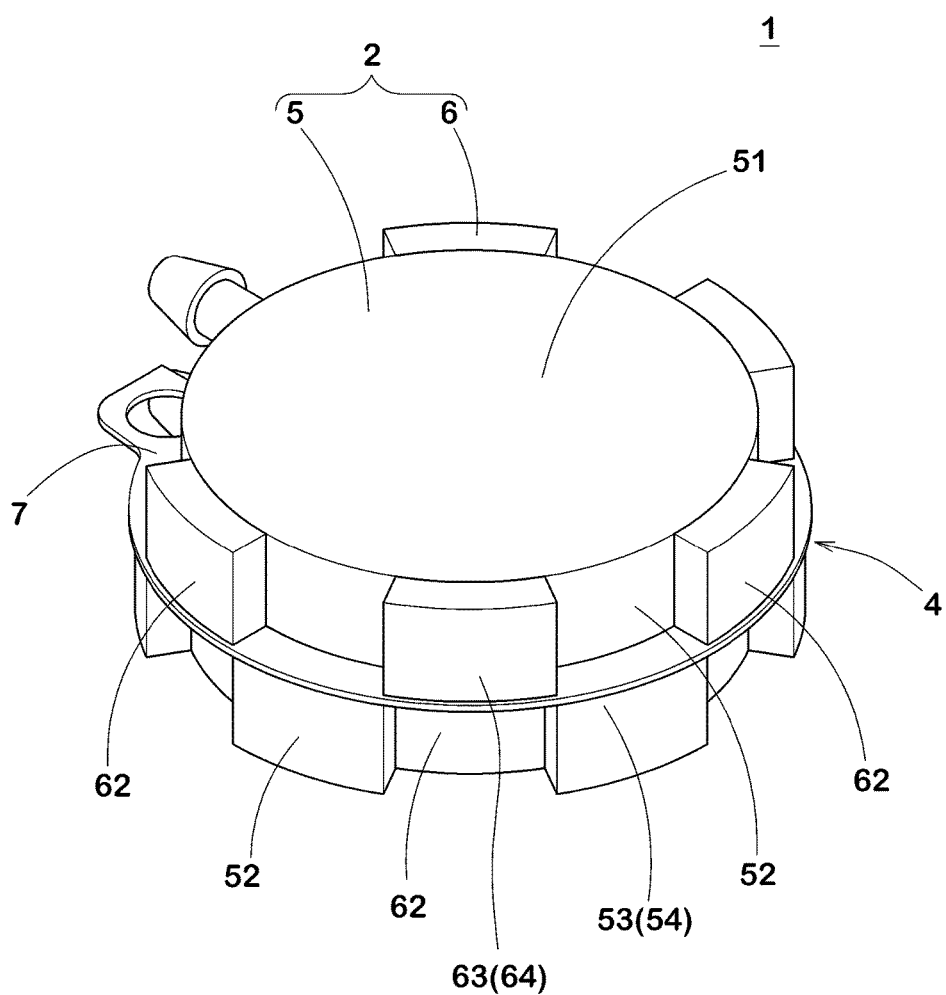
FIG. 2 A perspective view of the diaphragm pump shown in FIG. 1.
Figure 3:
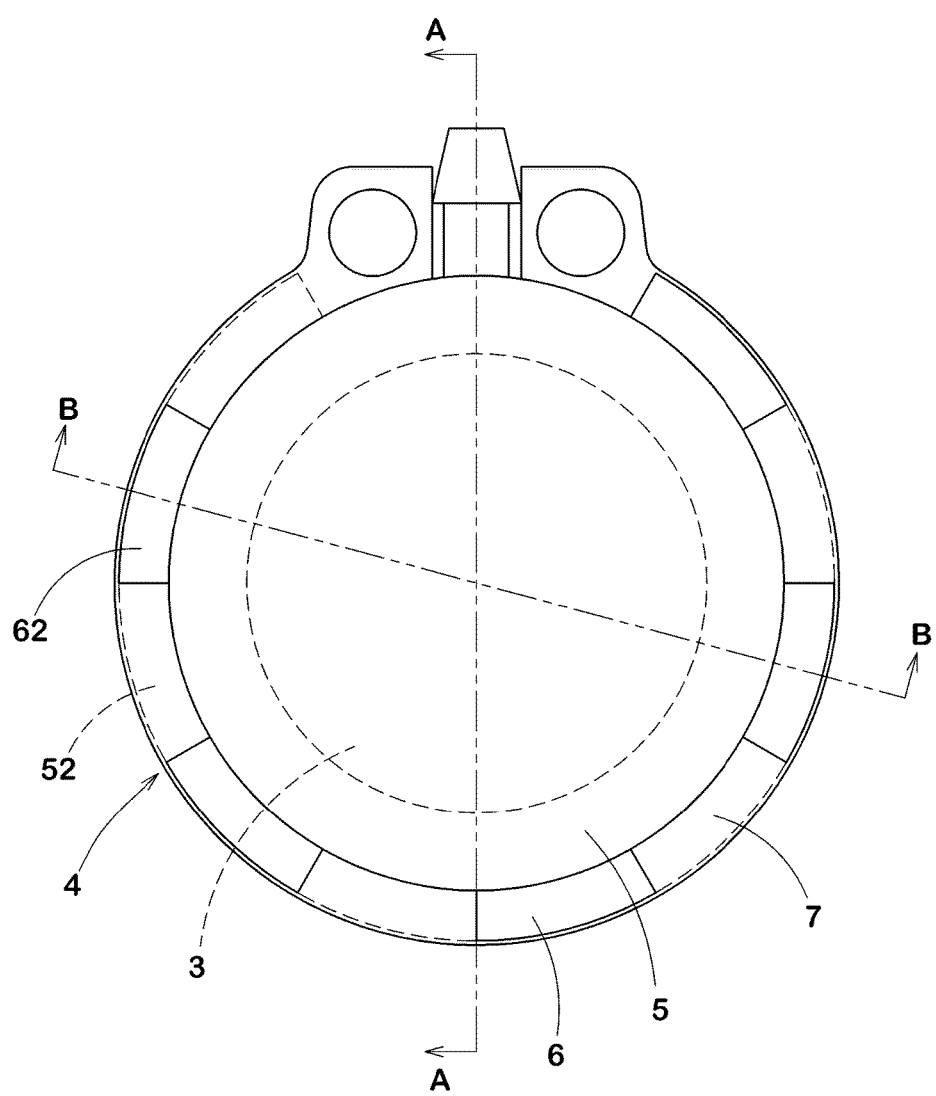
FIG. 3 A plan view of the diaphragm pump shown in FIG. 2.

In FIGS. 2 and 3, the external appearance of the diaphragm pump 1 is shown.

Figure 4:
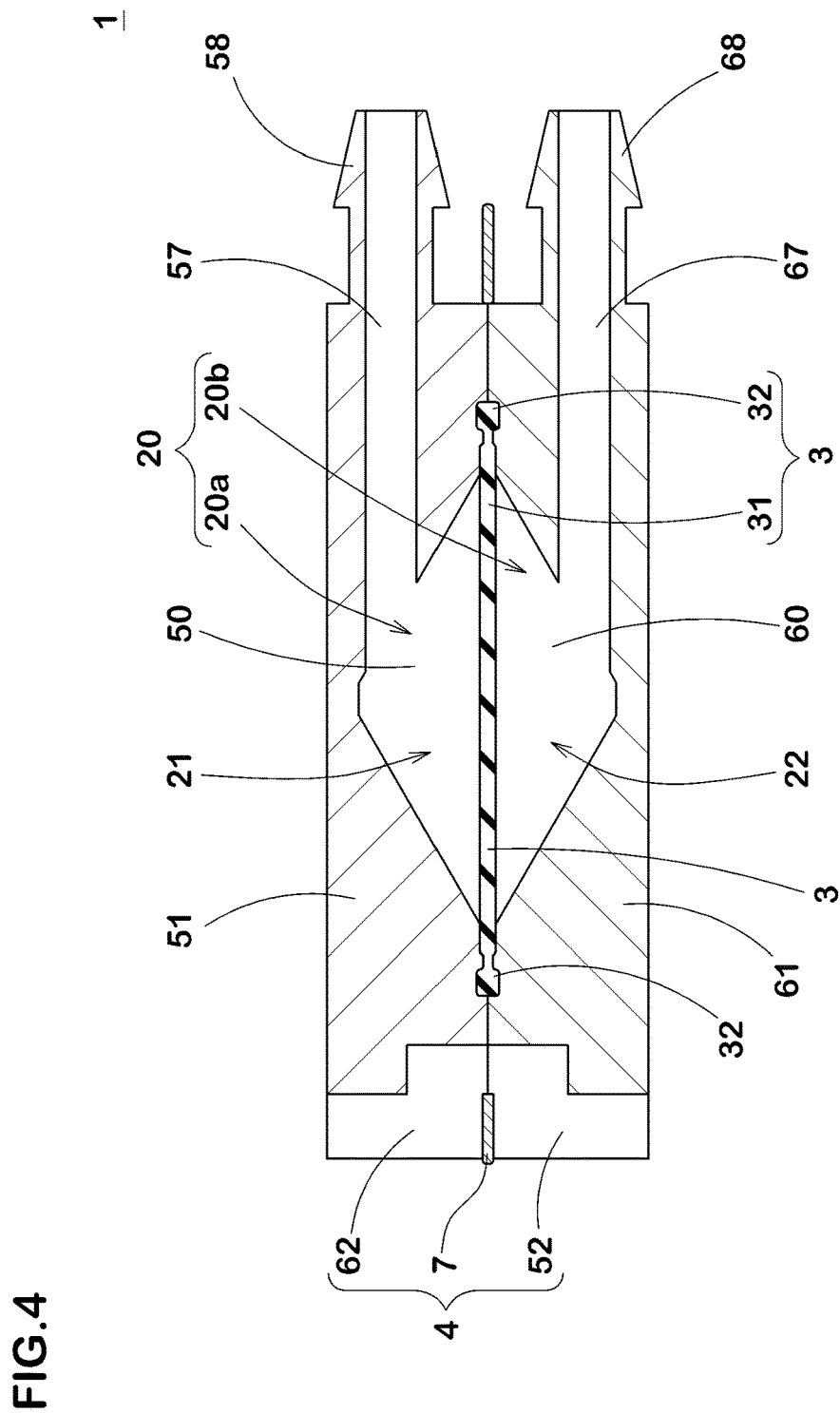
FIG. 4 A cross sectional view of the diaphragm shown in FIG. 3 taken along line A-A.
Figure 5:
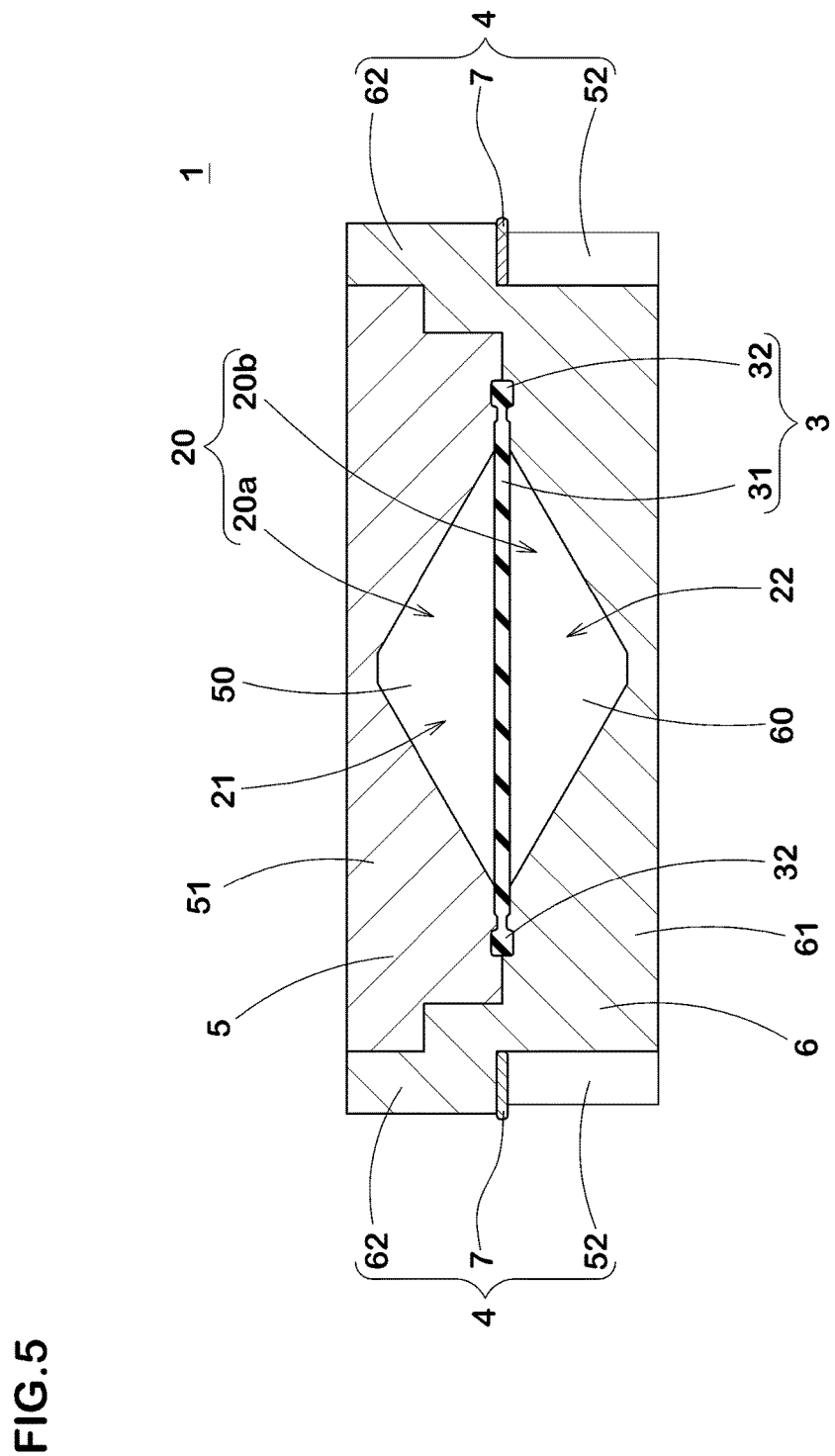
FIG. 5 A cross sectional view of the diaphragm shown in FIG. 3 taken along line B-B.

In FIG. 4 and FIG. 5, there are shown the A-A line section and B-B line section of the diaphragm pump 1 shown in FIG. 3.

Figure 6:
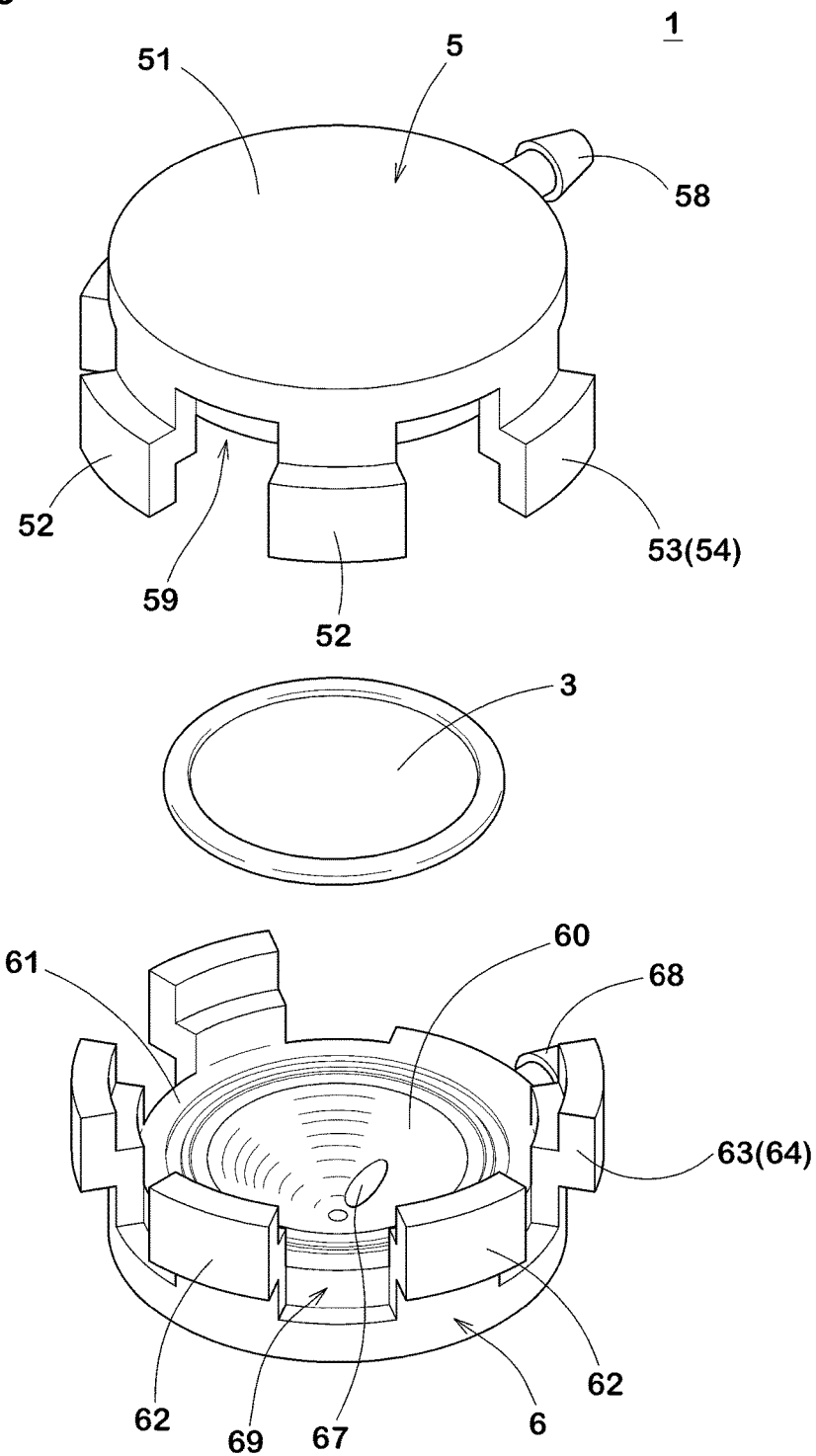
FIG. 6 An assembling perspective diagram of the diaphragm pump shown in FIG. 2.

In FIG. 6, there is shown an assembly perspective diagram of the diaphragm pump 1.

The diaphragm 3 is secured to the case 2 by a securing structure 4.

The case 2 of the diaphragm pump 1 has a first frame 5 having a first concave portion 50 and a second frame 6 having a second concave portion 60.

The first frame 5 and the second frame 6 fitted with each other achieve a stiff fitted state by a fastener 7.

The first concave portion 50 forms a space 20a on the first chest 21 side.

The second concave portion 60 forms a space 20b on the second chest 22 side.

The first concave portion 50 is opposed to the second concave portion 60.

The first concave portion 50 and the second concave portion 60 are formed in the form of an earthenware mortar.

The materials of the first frame 5 and the second frame 6 are determined in consideration of chemical resistance and the like. For example, PP (polypropylene), POM (polyacetal), PEEK (polyether ether ketone), PPS (polyphenylene sulfide), PTFE (polytetrafluoroethylene) or the like is used. In this embodiment, the first frame 5 and the second frame 6 are mechanically united by fitting without using adhesive, therefore, materials of poor adhesiveness can be used, and the freedom of choice of material is increased.

As shown in FIGS. 4 and 5, the diaphragm 3 has a membrane portion 31 dividing the space 20 into the first chest 21 and the second chest 22, and an edge portion 32 formed at the outer peripheral edge of the membrane portion 31.

The edge portion 32 is secured between the first frame 5 and the second frame 6.

By the elastic deformation of the membrane portion 31, the first chest 21 and the second chest 22 are alternately increased and decreased in their volumes.

The edge portion 32 of the diaphragm 3 is compressed and held between the first frame 5 and the second frame 6 which are fitted with each other. Thereby, the fluid being treated is suppressed from leaking from the edge portion 32 of the diaphragm 3.

The diaphragm 3 is formed from an elastic material which comprises, as the rubber component, at least one of Ethylene Propylene Diene (EPDM), fluoro rubber (FKM, FPM, FFKM), hydrogenated nitrile rubber (HNBR), butylene rubber (IIR) and silicone rubber (VMQ) for example.

If a rubber material including double bonds in its polymer main chain is used, there is a possibility that, during long-time use, the polymer main chain is broken, and it becomes impossible to maintain the durability of the diaphragm 3.

In particular, Ethylene Propylene Diene (EPDM) is preferred as the rubber component from the point of view of gas barrier, heat resistance, chemical resistance and production cost.

Figure 7:
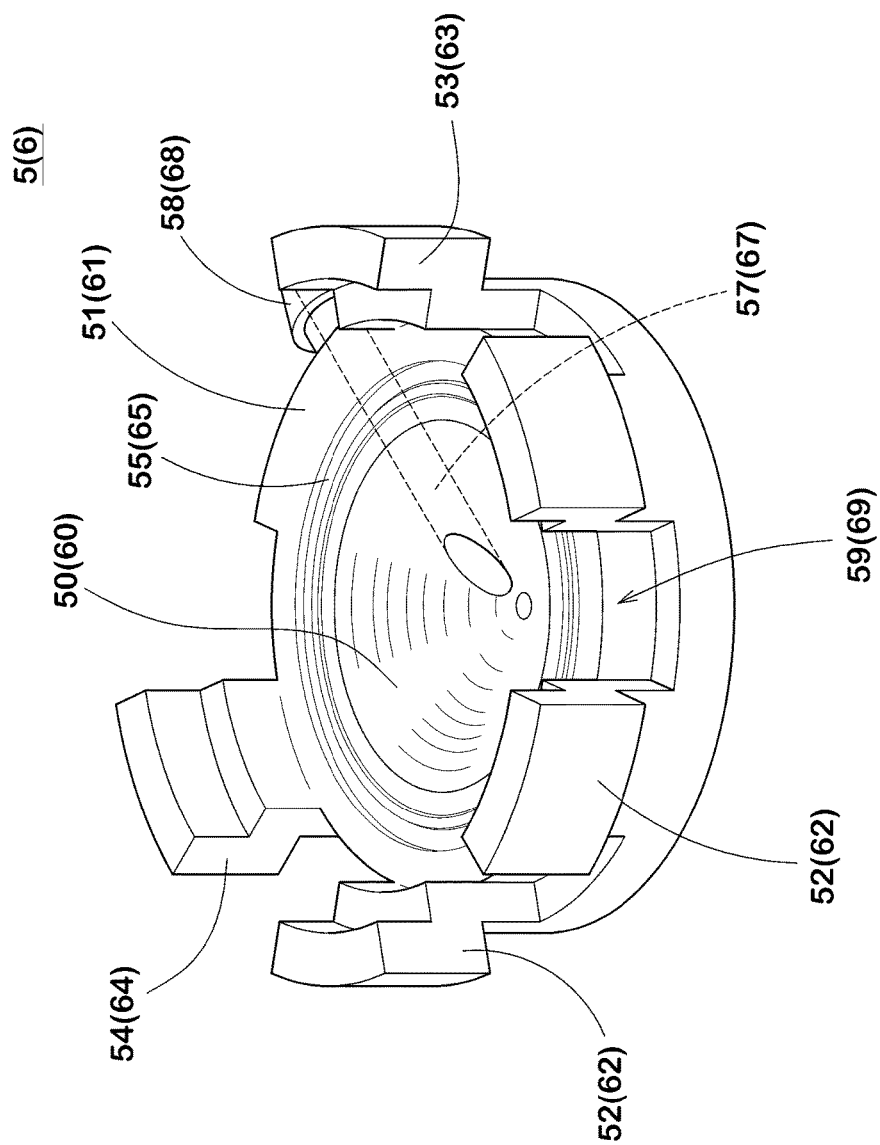
FIG. 7 A perspective view of the first or second case shown in FIG. 6.

FIG. 7 shows the first frame 5.

As shown in FIGS. 2, 3, 5, 7 etc., the first frame 5 has the first concave portion 50, a first frame main body 51 opposed to the second frame 6, and first arm portions 52 for holding the second frame 6 in a retained state.

The first concave portion 50 is formed in an inner end face of the first frame main body 51 which face is opposed to the second frame 6 across the diaphragm.

The first frame main body 51 is generally column-shaped.

The first arm portions 52 are disposed intermittently along an outer edge of the first frame main body 51.

In this embodiment, the first frame 5 and the second frame 6 are formed in the identical shape as shown in FIGS. 6 and 7. Accordingly, the first frame 5 and the second frame 6 can be manufactured by the use of the same mold, and the production cost of the diaphragm pump 1 can be reduced.

The second frame 6 has a second frame main body 61 opposed to the first frame 5, and second arm portions 62 for holding the first frame 5 in a retained state.

The second concave portion 60 is formed in an inner end face of the second frame main body 61 which face is opposed to the first frame 5.

The second frame main body 61 is generally column-shaped.

The second arm portions 62 are disposed intermittently along the outer edge of the second frame main body 61.

By the frictional force occurring between the first arm portions 52 and the second frame 6 when the first frame 5 and the second frame 6 are fitted with each other, the second frame 6 is held in the retained state.

Further, by the frictional force occurring between the second arm portions 62 and the first frame 5, a strong fitted state of the first frame 5 and the second frame 6 is realized.

The fastener 7 is attached to the first arm portions 52 and the second arm portions 62 from the outside of the case 2. In this embodiment, as the fastener 7, an elastically deformable metallic snap ring is used.

The fastener 7 may be configured to be detachable from the first arm portions 52 and the second arm portions 62.

when the fastener 7 is attached to the first arm portions 52 and the second arm portions 62, the first arm portions 52 and the second arm portions 62 are tightened by the fastener 7, and the first frame 5 is held in the retained state.

Thereby, the first frame 5 and the second frame 6 are fitted with each other and united without fastening screws and screw nuts. Therefore, it becomes possible to reduce the number of parts used in the structure 4 for securing the diaphragm 3, making the assembling easy, to achieve the cost-cutting. Further, it becomes possible to make the structure of the diaphragm pump 1 simple and inexpensive.

The first arm portions 52 are provided with a positional displacement preventing means 53 to maintain the position of the fastener 7.

The positional displacement preventing means 53 comprises a first retaining projection 54 jutting out outwardly of the case 2 on the second frame main body 61 side of the fastener 7 disposed in each first arm portion 52.

By being provided in the first arm portion 52 with the first retaining projection 54, the outside of the first arm portion 52 is stepped. The inside of the first arm portions 52 is also stepped.

Similarly, the second arm portions 62 are provided with a positional displacement preventing means 63 to maintain the position of the fastener 7.

The positional displacement preventing means 63 comprises a second retaining projection 64 jutting out outwardly of the case 2 on the first frame main body 51 side of the fastener 7 disposed in each second arm portion 62.

By being provided in the second arm portion 62 with the second retaining projection 64, the outside of the second arm portion 62 is stepped. The inside of the second arm portions 62 is also stepped.

when the fastener 7 is attached to the case 2, the fastener 7 biases the first retaining projection 54 toward the tip end of the first arm portion 52, and biases the second retaining projection 64 toward the tip end of the second arm portion 62. Thereby, the first frame main body 51 and the second frame main body 61 are closely contacted with each other, and the edge portion 32 of the diaphragm 3 is secured between the first frame main body 51 and the second frame main body 61 in a compressed state. Therefore, the fluid being treated is further suppressed from leaking from the edge portion 32 of the diaphragm 3.

The modes of the positional displacement preventing means 53 and 63 are not limited to the above described first retaining projection 54 and the second retaining projection 64. Any mode which functions to maintain the position of the fastener 7 may be employed. For example, the positional displacement preventing means 53, 63 may be an annular groove (not shown) extending along an outer edge of the case 2 in the outer circumference surface of the first arm portions 52 and the second arm portions 62.

By the annular groove, the position of the fastener 7 is maintained, and the contact of the first frame main body 51 with the second frame main body 61 is improved by the biasing force caused by the fastener 7, therefore, the leakage of the fluid being treated from the edge portion 32 of the diaphragm 3 is further suppressed.

As shown in FIGS. 4 and 7, the first frame 5 is provided with a first port 57 communicating with the first chest 21. The first port 57 is provided at the tip end with a nipple 58 for connecting a pipe (not shown).

Through the first port 57 and the pipe, gas for driving the diaphragm 3 flows in and flows out of the first chest 21.

The first arm portions 52 are formed not to interfere the nipple 58.

In this embodiment, the first port 57 extends along the end face of the column-shaped first frame 5 and communicates with the nipple 58 formed on the side surface. But, the first port 57 may be configured so as to extend toward the end face of the column-shaped first frame 5. In this case, the nipple 58 is formed on the end face of the first frame 5.

As shown in FIGS. 4 and 7, the second frame 6 is provided with a second port 67 communicating with the second chest 22. The second port 67 is provided at the tip end with a nipple 68 for connecting a pipe (not shown).

Through the second port 67 and the pipe, the fluid being treated flows in and flows out of the second chest 22.

Incidentally, the second arm portions 62 are formed not to interfere the nipple 68.

The first frame 5 and the second frame 6 are fitted with each other so that the nipple 58 overlaps the nipple 68 in a plan view.

In this embodiment, the second port 67 extends along the end face of the column-shaped second frame 6, and communicates with the nipple 68 formed on the side surface. But, the second port 67 may be configured so as to extend toward the end face of the column-shaped second frame 6. In this case, the nipple 68 is formed on the end face of the second frame 6.

As shown in FIGS. 2 and 6, the first arm portions 52 and the second arm portions 62 are alternately disposed along the outer circumference of the case 2. Thereby, it becomes possible to evenly compress the edge portion 32 of the diaphragm 3, and the fluid being treated is further suppressed from leaking from the edge portion 32 of the diaphragm 3.

Further, in this embodiment, the first arm portions 52 and the arm portions 62 are continuously provided along the outer circumference of the case 2. Thereby, it becomes possible to evenly compress the edge portion 32 of the diaphragm 3 with sufficient strength, and the leakage of the fluid being treated from the edge portion 32 of the diaphragm 3 is further suppressed.

As shown in FIGS. 6 and 7, between the adjacent first arm portions 52 of the first frame 5, third concave portions 59 are provided. The third concave portion 59 is formed in a stepped shape complementary with the second arm portion 62 of the second frame 6. The third concave portions 59 fit with the second arm portions 62 of the second frame 6. By the fitting, the first frame 5 and the second frame 6 are more strongly fitted with each other and united. Therefore, the leakage of the fluid being treated from the edge portion 32 of the diaphragm 3 is further suppressed.

Between the adjacent second arm portions 62 of the second frame 6, on the other hand, fourth concave portions 69 are provided. The fourth concave portion 69 is formed in a stepped shape complementary with the first arm portion 52 of the first frame 5. The fourth concave portions 69 fit with the first arm portions 52 of the first frame 5. Thereby, the first frame 5 and the second frame 6 are more strongly fitted with each other and united. Therefore, the leakage of the fluid being treated from the edge portion 32 of the diaphragm 3 is further suppressed.

Figure 8:
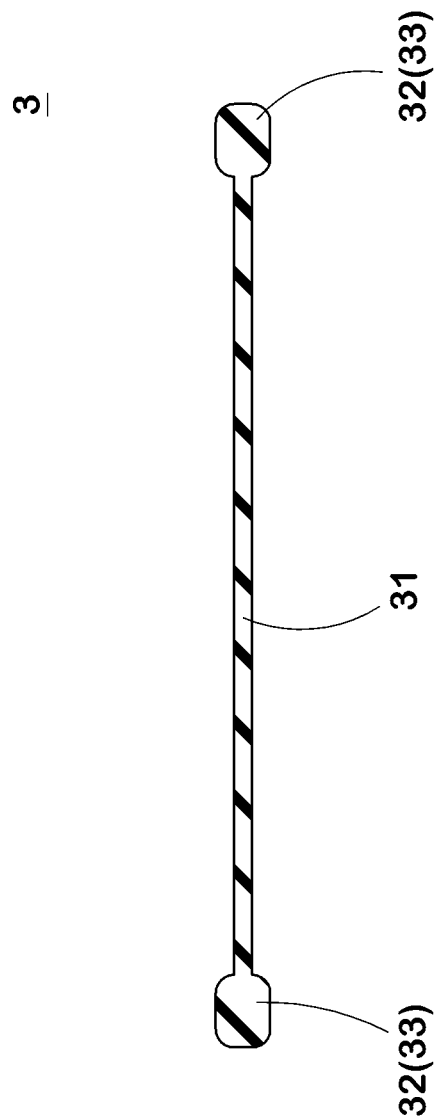
FIG. 8 A cross sectional view of the diaphragm shown in FIG. 6.

FIG. 8 shows the A-A line section of the diaphragm 3. In the edge portion 32 of the diaphragm 3, a thick part 33 whose thickness is more than that of the membrane portion 31 is continuously formed. Thereby, the first frame 5 and the second frame 6 can hold the diaphragm 3 by exerting enough pressure to the thick part 33, while securing sufficient durability for the diaphragm 3, and the leakage of the fluid being treated from the edge portion 32 of the diaphragm 3 is further suppressed.

As shown in FIG. 7, the first frame 5 is provided with a groove 55 in which the thick part 33 fits.

Similarly, the second frame 6 is provided with a groove 65 in which the thick part 33 fits.

The total of the depths of the groove 55 and the groove 65 is set to be smaller than the thickness of the thick part 33. By the grooves 55 and 65, the thick part 33 is moderately compressed, and the leakage of the fluid being treated from the edge portion 32 of the diaphragm 3 is further suppressed. when assembling the diaphragm 3 in the inside of the first frame 5 and the second frame 6, the grooves 55 and 65 function as a positioning groove, and increase the manufacturing efficiency of the diaphragm pump 1.

Hereinafter, a method of securing the diaphragm 3 to the case 2 in this embodiment will be described with reference to FIG. 6.

The method of securing the diaphragm comprises a frame fitting step, a diaphragm holding step, and a fastener attaching step.

In the frame fitting step, the first concave portion 50 (cf. FIG. 5) and the second concave portion 60 are opposed to each other across the diaphragm 3, and
the first frame 5 and the second frame 6 are fitted with each other so that the first arm portions 52 and the arm portions 62 are arranged alternately along the outer edge of the case 2.

In the diaphragm holding step, the edge portion 32 of the diaphragm 3 is compressed and held between the first frame 5 and the second frame 6.

In the subsequent fastener attaching step, the fastener 7 is attached to the first arm portions 52 and the second arm portions 62 from the outside of the case 2.
Thereby, the first arm portions 52 and the second arm portions 62 are tightened by the fastener 7. Thus, the strong fitted state of the first frame 5 and the second frame 6 is realized, and the first frame 5 and the second frame 6 are strongly united.

Second Embodiment

Figure 9:
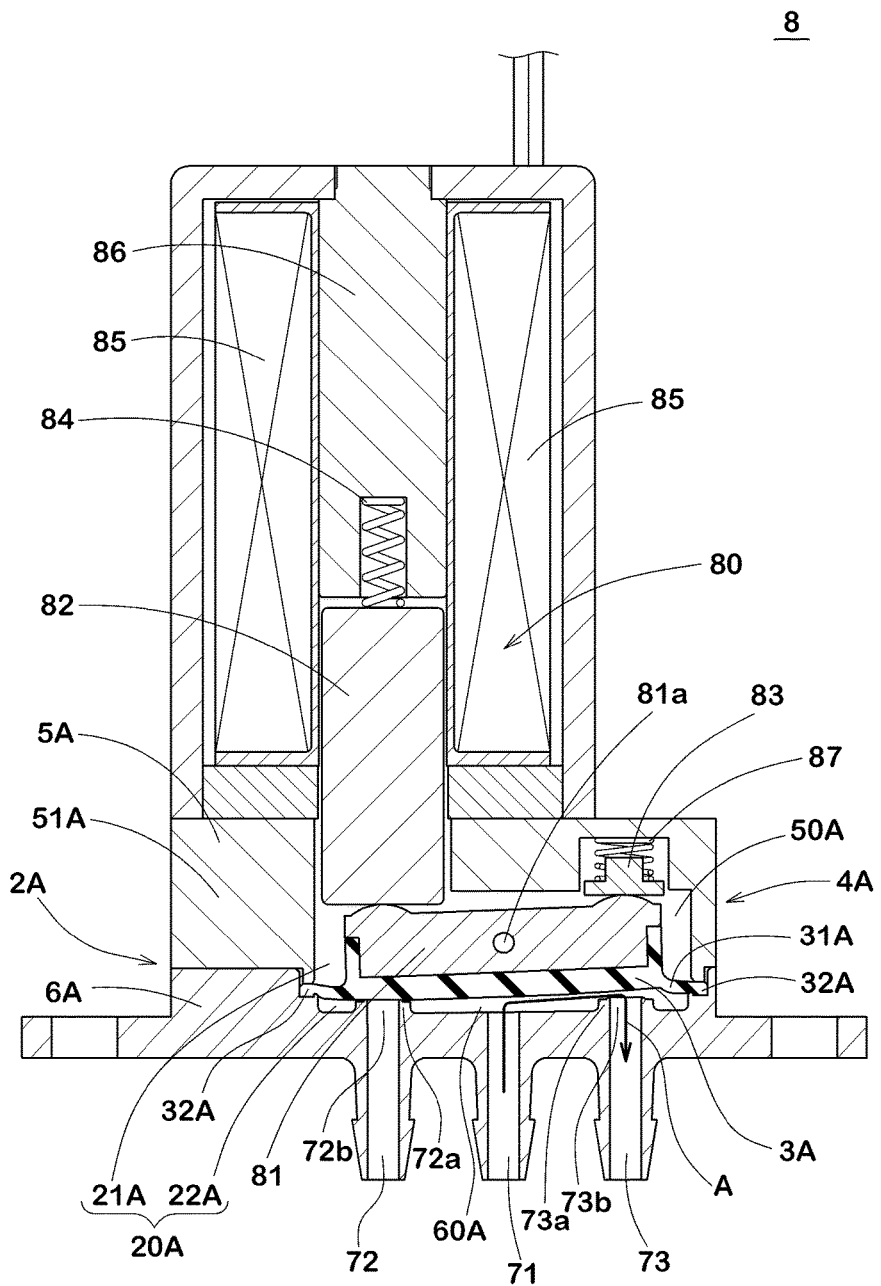
FIG. 9 A cross sectional view showing the structure of a valve device as another embodiment of the present invention.

FIG. 9 shows a valve device as a second embodiment of the present invention.
The valve device 8 has a case 2A forming a space 20A therein, and a diaphragm 3A dividing the space 20A into a first chest 21A and a second chest 22A.
The diaphragm 3A is secured to the case 2A by a securing structure 4A.

The case 2A has a first frame 5A having a first concave portion 50A, and a second frame 6A having a second concave portion 60A. The first concave portion 50A forms a space on the first chest 21A side. The second concave portion 60A forms a space on the second chest 22A side.

The diaphragm 3A has a membrane portion 31A dividing the space 20A into the first chest 21A and the second chest 22A, and an edge portion 32A formed at the outer peripheral edge of the membrane portion 31A.
The edge portion 32A is secured between the first frame 5A and the second frame 6A.
By the elastic deformation of the membrane portion 31A, the diaphragm 3A can make oscillating movements.

The edge portion 32A of the diaphragm 3A is compressed and held between the first frame 5A and the second frame 6A which are fitted with each other. Thereby, the leakage of the fluid being treated from the edge portion 32A of the diaphragm 3A is suppressed.

The materials of the first frame 5A and the second frame 6A are the same as those of the first frame 5 and the second frame 6 in the first embodiment.
The material of the diaphragm 3A is the same as that of the diaphragm 3 in the first embodiment.

The first concave portion 50A of the first frame 5A, namely, the first chest 21A is provided with a driving means 80 for driving the diaphragm 3A.
The diaphragm 3A is oscillated by being driven by the driving means 80.

The driving means 80 has an oscillating member 81 oscillating integrally with the diaphragm 3A, a first plunger (moving core) 82 for pressing one end of the oscillating member 81, a second plunger 83 for pressing the other end of the oscillating member 81 and the like.
The oscillating member 81 is housed in the space 20A.
The oscillating member 81 is freely turnably supported by the shaft member 81a.
Both ends of the shaft member 81a are supposed by the first frame 5A.

The first plunger 82 is driven by a first coiled spring 84, a solenoidal coil 85 and a fixed iron core 86, and transmits its driving force to the oscillating member 81.
The second plunger 83 is driven by a second coiled spring 87, and transmits its driving force to the oscillating member 81. The spring load of the first coiled spring 84 is set to be more than the spring load of the second coiled spring 87.
The oscillating member 81 and the diaphragm 3A receive the driving force transmitted by the first plunger 82 and the second plunger 83, and they are turned around the shaft member 81a like a seesaw.

The second frame 6A has an inflow port (Common port) 71 for flowing the fluid into the second chest 22A, and a NC (Normally close) outflow port 72 and NO (Normally open) outflow port 73 for flowing the fluid out of the second chest 22A.
The NC outflow port 72 has an opening 72b around which a valve seat 72a is formed. The diaphragm 3A sits on and leaves the valve seat 72a to close and open the NC outflow port 72.
The NO outflow port 73 has an opening 73b around which a valve seat 73a is formed. The diaphragm 3A sits on and leaves the valve seat 73a to close and open the NO outflow port 73.
By the turning of the oscillating member 81, either one of the NC outflow port 72 and the NO outflow port 73 is closed, and the other is opened. Thereby, the ports are alternately opened and closed.

In this embodiment, the valve device 8 is so called electromagnetic valve to switch the flow paths such that, by the electromagnetic force caused by the solenoidal coil 85 of the driving means 80, the diaphragm 3A is actuated to open and close the NC outflow port 72 and the NO outflow port 73.

Hereinafter, the opening-closing action of the valve device 8 will be described.

The inflow port 71 is always opened, and the fluid is fed into the second chest 22A through the inflow port 71.
As previously mentioned, since the spring load of the first coiled spring 84 is larger than the spring load of the second coiled spring 87, an elastomeric force generated by the first coiled spring 84 is larger than an elastomeric force generated by the second coiled spring 87.
At normal times, therefore, as shown in FIG. 9, the oscillating member 81 and the diaphragm 3A maintain such a posture that they are turned counterclockwise in the figure, wherein the NC outflow port 72 is closed, and the NO outflow port 73 is opened.
Thereby, the fluid flowing into the second chest 22A from the inflow port 71 is discharged from the NO outflow port 73 as indicated by arrow (A).

Figure 10:
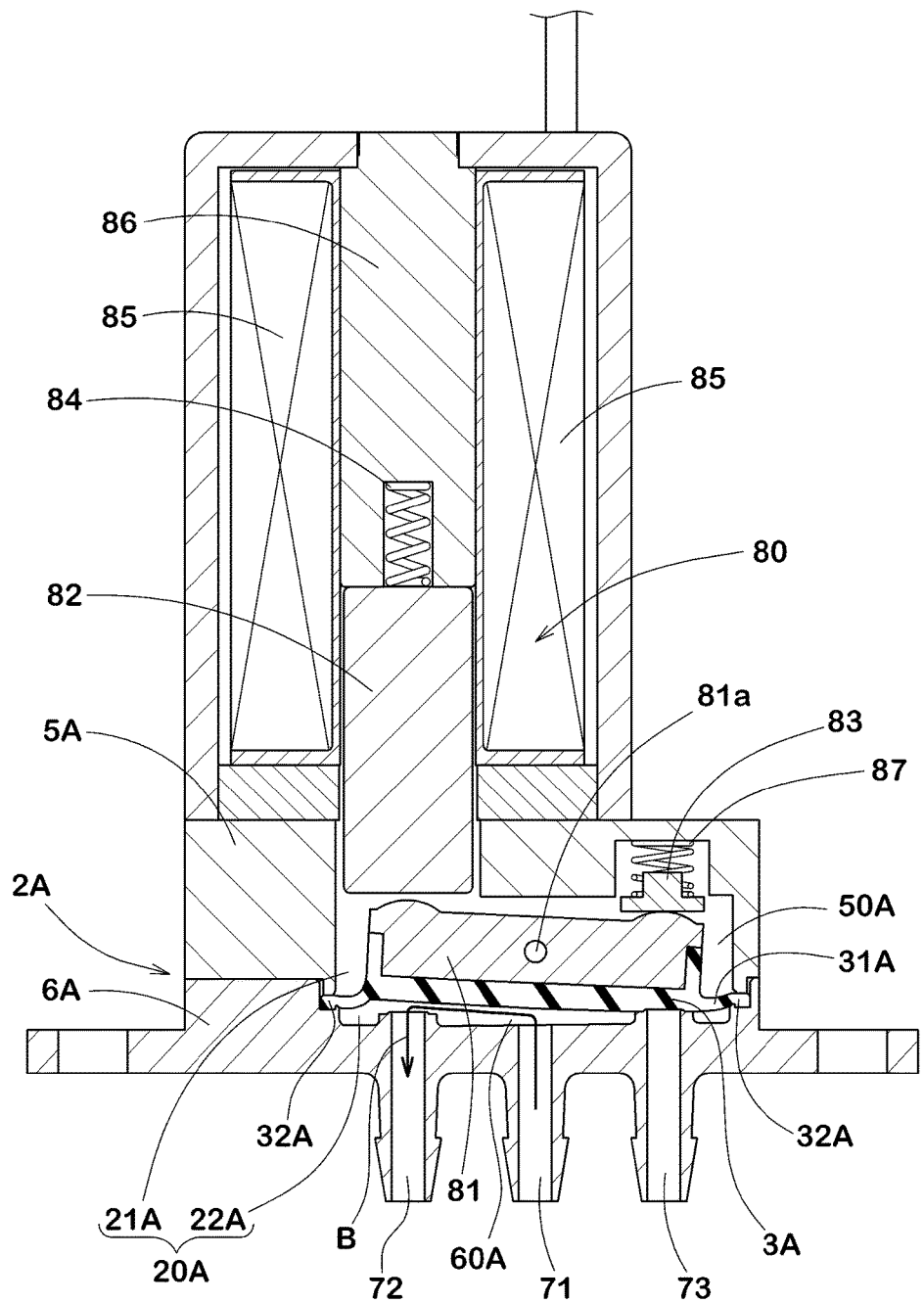
FIG. 10 A cross sectional view showing a state of the valve device shown in FIG. 9 in which the solenoidal coil is energized.

FIG. 10 shows the valve device 8 in a state such that the solenoidal coil 85 is energized.
when a predetermined electric current flows through the solenoidal coil 85, the electromagnetic force thereof moves the first plunger 82 toward a direction to compress the first coiled spring 84. At this moment, the second plunger 83 presses the oscillating member 81, therefore, the oscillating member 81 and the diaphragm 3A are turned clockwise, and the NO outflow port 73 is closed, and the NC outflow port 72 is opened.
Thereby, the fluid flowing into the second chest 22A from the inflow port 71 as indicated by arrow B is discharged from the NC outflow port 72.

Figure 11:
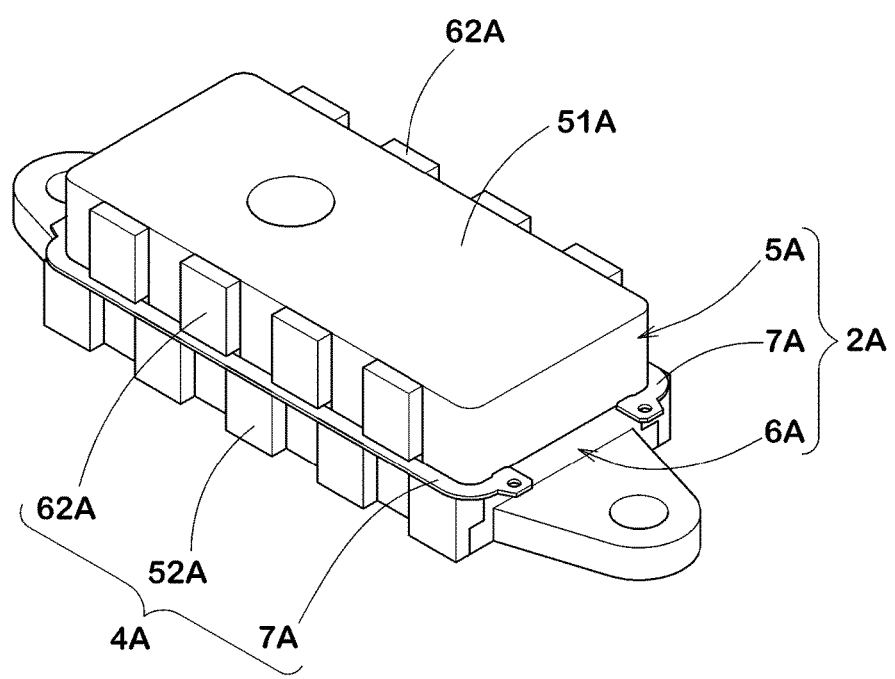
FIG. 11 A perspective view of the case shown in FIG. 9.
Figure 12:
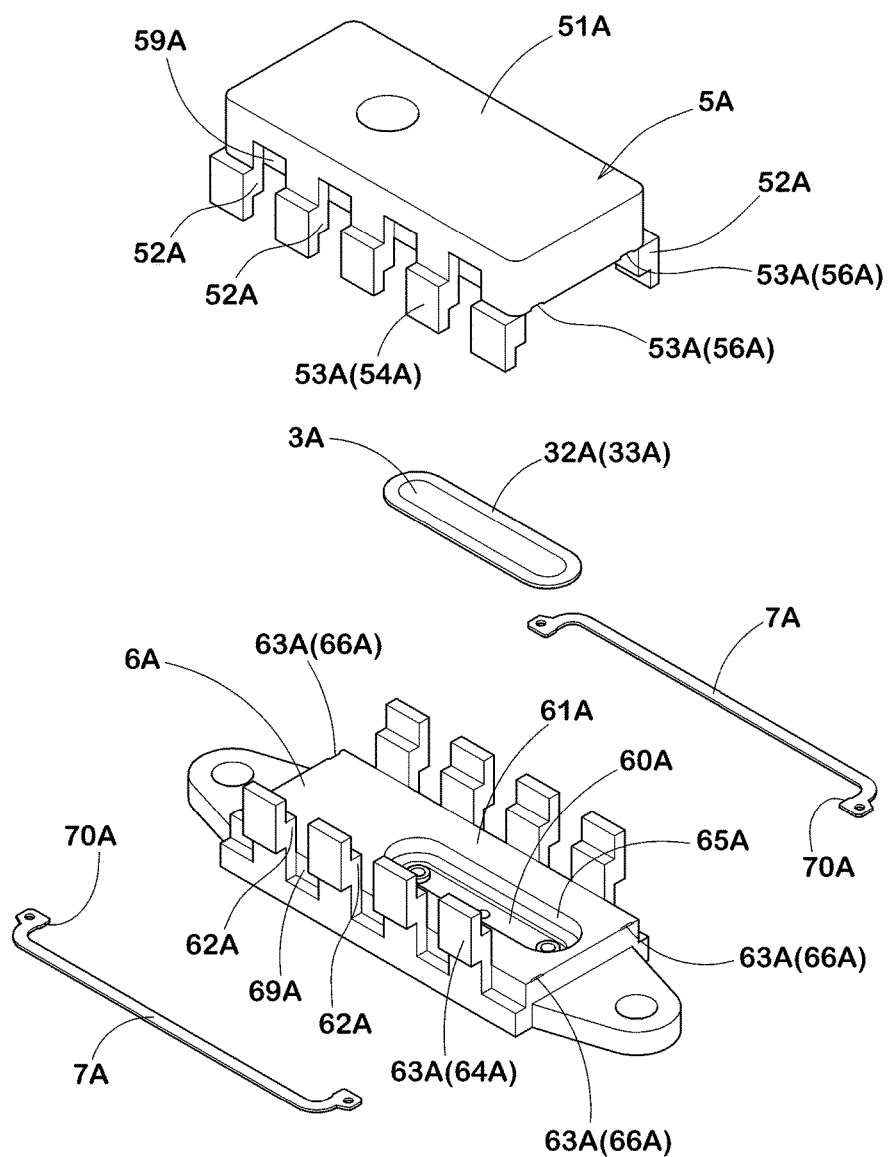
FIG. 12 An assembling perspective diagram of the case shown in FIG. 11.

FIG. 11 is a perspective view of the case 2A which the valve device 8 is equipped with.
FIG. 12 is an assembling perspective diagram of the case 2 and the diaphragm 3A.

The first frame 5A has the first concave portion 50A, a first frame main body 51A opposed to the second frame 6A, and first arm portions 52A for holding the second frame 6 in a retained state.

As shown in FIG. 9, the first concave portion 50A is formed in an inner end face of the first frame main body 51A which face is opposed to the second frame 6A.

The first arm portions 52A are disposed along an outer edge of the first frame main body 51A.

The second frame 6A has a second frame main body 61A opposed to the first frame 5A, and second arm portions 62A for holding the first frame 5A in a retained state.

The second frame main body 61A is provided in the inner end face opposed to the first frame 5A with the second concave portion 60A.

The second arm portions 62A are disposed along an outer edge of the second frame main body 61A.

By the frictional force occurring between the first arm portions 52A and the second frame 6A when the first frame 5A and the second frame 6A are fitted with each other, the second frame 6A is held in the retained state.

Further, by the frictional force occurring between the second arm portions 62A and the first frame 5A, a strong fitted state of the first frame 5A and the second frame 6A is realized.

The fastener 7A is attached to the first arm portions 52A and the second arm portions 62A from the outside of the case 2A. In this embodiment, as the fastener 7A, an elastically deformable metallic snap ring is used.

The fastener 7A may be configured to be detachable from the first arm portions 52A and the second arm portions 62A.

When the fastener 7A is attached to the first arm portions 52 and the second arm portions 62, the first arm portions 52 and the second arm portions 62 are tightened by the fastener 7A, and the first frame 5A is held in the retained state.

Thereby, the first frame 5A and the second frame 6A are fitted with each other and united without fastening screws and screw nuts. Therefore, it becomes possible to reduce the number of parts used in the structure 4A for securing the diaphragm 3A, making the assembling easy, to achieve the cost-cutting.

Further, it becomes possible to make the structure of the valve device 8 simple and inexpensive.

In this embodiment, a pair of the fasteners 7A divided into two are used in consideration of easiness when attached to the first arm portions 52 and the second arm portions 62, but it may be possible to use a single annular fastener.

The first arm portions 52A are provided with a positional displacement preventing means 53A for maintaining the position of the fastener 7A.

The positional displacement preventing means 53A comprises a first retaining projection 54A jutting out outwardly of the case 2A on the second frame main body 61A side of the fastener 7A disposed in each of the first arm portions 52A.

By being provided in the first arm portion 52A with the first retaining projection 54A, the outside of the first arm portion 52A is stepped. The inside of the first arm portions 52A is also stepped.

Similarly, the second arm portions 62A are provided with a positional displacement preventing means 63A for maintaining the position of the fastener 7A.

The positional displacement preventing means 63A comprises a second retaining projection 64A jutting out outwardly of the case 2A on the first frame main body 51A side of the fastener 7A disposed in each of the second arm portions 62A.

By being provided in the second arm portion 62A with the second retaining projection 64A, the outside of the second arm portion 62A is stepped. The inside of the second arm portions 62A is also stepped.

When the fastener 7A is attached to the case 2A, the fastener 7A biases the first retaining projections 54A toward the tip ends of the first arm portions 52A, and biases the second retaining projections 64A toward the tip ends of the second arm portions 62A as a counteraction.

Thereby, the first frame main body 51A and the second frame main body 61A closely contact with each other, and the edge portion 32A of the diaphragm 3A is secured between the first frame main body 51A and the second frame main body 61A in a compressed state. Therefore, the leakage of the fluid being treated at the edge portion 32A of the diaphragm 3A is further suppressed.

In this embodiment, as shown in FIG. 12, an outer edge of the first frame main body 51A is provided with third concave portions 56A as the positional displacement preventing means 53A. Similarly, an outer edge of the second frame main body 61A is provided with fourth concave portions 66A as the positional displacement preventing means 63A.

The third concave portions 56A and the fourth concave portions 66A are fitted by protruding portions 70A which are formed at the tip ends of the fastener 7A so as to protrude inwardly.

By the fitting of the protruding portions 70A to the third concave portion 56A and the fourth concave portion 66A, the positional displacement and coming off of the fastener 7A can be prevented.

The mode of the positional displacement preventing means 53A is not limited to the above described first retaining projections 54A and third concave portions 56A. Any mode may be employed as far as it has a function to maintain the position of the fastener 7A.

Similarly, the mode of the positional displacement preventing means 63A is not limited to the above described second retaining projections 64A and fourth concave portions 66A. Any mode may be employed as far as it has a function to maintain the position of the fastener 7A.

For example, the positional displacement preventing means 53A, 63A may be an annular groove (not shown) extending along the outer edge of the case 2A in the outer circumference surfaces of the first arm portions 52A and the second arm portions 62A.

Such annular groove can maintain the position of the fastener 7A, and the contact between the first frame main body 51A and the second frame main body 61A is improved by the biasing force caused by the fastener 7A, therefore, the leakage of the fluid being treated from the edge portion 32A of the diaphragm 3A is further suppressed.

The first arm portions 52A and the second arm portions 62A are alternately disposed along the outer circumference of the case 2A. Thereby, it becomes possible to evenly compress the edge portion 32A of the diaphragm 3A, and the leakage of the fluid being treated from the edge portion 32A of the diaphragm 3A is further suppressed.

Further, in this embodiment, the first arm portions 52A and the second arm portions 62A are continuously provided along the outer circumference of the case 2A. Thereby, it becomes possible to evenly compress the edge portion 32A of the diaphragm 3A with sufficient strength, therefore, the leakage of the fluid being treated from the edge portion 32A of the diaphragm 3A is further suppressed.

Between the adjacent first arm portions 52A of the first frame 5A, fifth concave portions 59A are formed. The fifth concave portion 59A is formed in a stepped shape complementary with the second arm portion 62A of the second frame 6A.

The fifth concave portions 59A are fitted with the second arm portions 62A of the second frame 6A.

Thereby, the first frame 5A and the second frame 6A are strongly fitted with each other and united. Therefore, the leakage of the fluid being treated from the edge portion 32A of the diaphragm 3A is further suppressed.

Between the adjacent second arm portions 62A of the second frame 6A, on the other hand, sixth concave portions 69A are formed. The sixth concave portions 69A are formed in a stepped shape complementary with the first arm portion 52A of the first frame 5A.

The sixth concave portions 69A are fitted with the first arm portions 52A of the first frame 5A. Thereby, the first frame 5A and the second frame 6A are fitted each other strongly and united. Therefore, the leakage of the fluid being treated from the edge portion 32A of the diaphragm 3A is further suppressed.

The edge portion 32A of the diaphragm 3A is continuously provided with a thick part 33A whose thickness is more than the membrane portion 31A. Thereby, the durability of the diaphragm 3A is fully secured, and the first frame 5A and the second frame 6A can hold the diaphragm 3A, while exerting an enough pressure to the thick part 33A. Thus, the leakage of the fluid being treated from the edge portion 32A of the diaphragm 3A is further suppressed.

The second frame 6A is provided with a groove 65A in which the thick part 33A is fitted.

Hereinafter, a method of securing diaphragm (A) which is to secure the diaphragm 3A to the case 2A in this embodiment, will be described with reference to FIG. 11.

The method of securing the diaphragm 3A comprises a frame fitting step, a diaphragm holding step, and a fastener attaching step.

In the frame fitting step, the first concave portion 50A (cf. FIG. 9) is opposed to the second concave portion 60A across the diaphragm 3A, and the first frame 5A and the second frame 6A are fitted with each other so that the first arm portions 52A and the second arm portions 62A are alternately arranged along the outer edge of the case 2A.

In the diaphragm holding step, the edge portion 32A of the diaphragm 3A are compressed and held between the first frame 5A and the second frame 6A.

In the subsequent fastener attaching step, the fastener 7A is attached to the first arm portions 52A and the second arm portions 62A from the outside of the case 2A.

Thereby, the first arm portions 52A and the second arm portions 62A are constricted by the fastener 7A, and the first frame 5A and the second frame 6A are held in the retained state.

Therefore, it is possible to achieve a state in which the first frame 5A and the second frame 6A are firmly fitted with each other, and the first frame 5A and the second frame 6A are strongly united.

While detailed description has been made of the valve device according to the present invention, the present invention can be embodied in various forms without being limited to the illustrated embodiments.

DESCRIPTION OF THE SIGNS 1 diaphragm pump
2 case
3 diaphragm
4 securing structure
5 first frame
6 second frame
7 fastener
8 valve device
20 space
21 first chest
22 second chest
32 edge portion
33 thick part
50 first concave portion
51 first frame main body
52 first arm portions
53 positional displacement preventing means
54 first retaining projection
60 second concave portion
61 second frame main body
62 second arm portions
63 positional displacement preventing means
64 second retaining projection
71 inflow port
72 NC outflow port
73 NO outflow port
80 driving means

The invention claimed is:

1. A structure for securing a diaphragm which divides a space into a first chest and a second chest, to a case which forms the space therein,
    wherein
        the case has a first frame having a first concave portion defining the first chest, and a second frame having a second concave portion defining the second chest,
        the first frame has a first frame main body opposed to the second frame, and first arm portions disposed intermittently along an outer edge of the first frame main body and extending toward the second frame,
        the second frame has a second frame main body opposed to the first frame, and second arm portions disposed intermittently along an outer edge of the second frame main body and extending toward the first frame,
        an edge portion of the diaphragm is compressed and held between the first frame and the second frame which are fitted with each other, and
    characterized by further including
        a fastener for constricting the first arm portions and the second arm portions from the outside of the case.

2. The structure for securing a diaphragm as set forth in claim 1, wherein the first arm portions and the second arm portions are provided with a positional displacement preventing means to maintain the position of the fastener.

3. The structure for securing a diaphragm as set forth in claim 2, wherein the first arm portions and the second arm portions are alternately dispersed along the outer edge of the case.

4. The structure for securing a diaphragm as set forth in claim 2, wherein the first arm portions and the second arm portions are continuously provided along the outer circumference of the case.

5. The structure for securing a diaphragm as set forth in claim 2, wherein the edge portion of the diaphragm is provided with a thick part having a larger thickness.

6. The structure for securing a diaphragm as set forth in claim 2, wherein the positional displacement preventing means comprises a first retaining projection disposed on each of the first arm portions and jutting out outwardly of the case on the second frame main body side of the fastener, and a second retaining projection disposed on each of the second arm portions and jutting out outwardly of the case on the first frame main body side of the fastener.

7. The structure for securing a diaphragm as set forth in claim 6, wherein the first arm portions and the second arm portions are alternately dispersed along the outer edge of the case.

8. The structure for securing a diaphragm as set forth in claim 6, wherein the first arm portions and the second arm portions are continuously provided along the outer circumference of the case.

9. The structure for securing a diaphragm as set forth in claim 6, wherein the edge portion of the diaphragm is provided with a thick part having a larger thickness.

10. The structure for securing a diaphragm as set forth in claim 2, wherein the positional displacement preventing means is an annular groove extending along an outer edge of the case in the outer circumference surfaces of the first arm portions and the second arm portions.

11. The structure for securing a diaphragm as set forth in claim 10, wherein the first arm portions and the second arm portions are alternately dispersed along the outer edge of the case.

12. The structure for securing a diaphragm as set forth in claim 10, wherein the first arm portions and the second arm portions are continuously provided along the outer circumference of the case.

13. The structure for securing a diaphragm as set forth in claim 1, wherein the first arm portions and the second arm portions are alternately dispersed along the outer edge of the case.

14. The structure for securing a diaphragm as set forth in claim 13, wherein the first arm portions and the second arm portions are continuously provided along the outer circumference of the case.

15. The structure for securing a diaphragm as set forth in claim 1, wherein the first arm portions and the second arm portions are continuously provided along the outer circumference of the case.

16. The structure for securing a diaphragm as set forth in claim 1, wherein the edge portion of the diaphragm is provided with a thick part having a larger thickness.

17. The structure for securing a diaphragm as set forth in claim 16, wherein the first frame and/or the second frame is provided with a positioning groove at which the thick part is disposed.

18. A diaphragm pump equipped with the structure for securing a diaphragm as set forth in claim 1 and wherein
the first frame is provided with a first port communicating with the first chest,
the second frame is provided with a second port communicating with the second chest,
a fluid for driving the diaphragm is fed to the first chest via the first port, and
a fluid being treated flows in and flows out of the second chest via the second port.

19. A valve device having the structure for securing a diaphragm as set forth in claim 1 and wherein
the first chest of the first frame is provided with a driving means for driving the diaphragm,
the second frame has an inflow port for flowing the fluid into the second chest, and an outflow port for flowing the fluid out of the second chest,
the outflow port has an opening around which a valve seat is formed, wherein
the diaphragm sits on and leaves the valve seat to close and open the outflow port.

20. A method of securing a diaphragm which divides a space into a first chest and a second chest, to a case forming the space therein,
wherein
the case has a first frame having a first concave portion defining the first chest, and a second frame having a second concave portion defining the second chest,
the first frame has a first frame main body opposed to the second frame, and first arm portions disposed intermittently along an outer edge of the first frame main body and extending toward the second frame, and
the second frame has a second frame main body opposed to the first frame, and second arm portions disposed intermittently along an outer edge of the second frame main body and extending toward the first frame, and
characterized by comprising
a fitting step of fitting the first frame with the second frame,
a diaphragm holding step of compressing and folding an edge portion of the diaphragm between the first frame and the second frame, and
a fastener attaching step of constricting the first frame and the second frame by attaching a fastener to the first arm portions and the second arm portions from the outside of the case.

* * * * *